United States Patent
Bungo

(10) Patent No.: US 10,073,505 B2
(45) Date of Patent: Sep. 11, 2018

(54) ANALYTICAL DEVICE

(71) Applicant: SHIMADZU CORPORATION, Kyoto-shi, Kyoto-fu (JP)

(72) Inventor: Hajime Bungo, Kyoto (JP)

(73) Assignee: SHIMADZU CORPORATION, Kyoto-shi, Kyoto-fu (JP)

( * ) Notice: Subject to any disclaimer, the term of this patent is extended or adjusted under 35 U.S.C. 154(b) by 409 days.

(21) Appl. No.: 14/335,457

(22) Filed: Jul. 18, 2014

(65) Prior Publication Data

US 2016/0018863 A1 Jan. 21, 2016

(51) Int. Cl.
- *G06F 1/26* (2006.01)
- *G05B 15/02* (2006.01)
- *G06F 1/30* (2006.01)
- *G06F 11/00* (2006.01)
- *G06F 11/07* (2006.01)

(52) U.S. Cl.
CPC ............... *G06F 1/26* (2013.01); *G05B 15/02* (2013.01); *G06F 11/00* (2013.01); *G06F 1/263* (2013.01); *G06F 1/30* (2013.01); *G06F 11/0796* (2013.01)

(58) Field of Classification Search
CPC . G06F 1/26; G06F 1/263; G05B 15/02; G06F 11/00; G06F 11/0796; G06F 1/30
USPC ................ 713/300; 714/24, 100; 702/1, 127
See application file for complete search history.

(56) References Cited

U.S. PATENT DOCUMENTS

| | | | | |
|---|---|---|---|---|
| 5,815,409 A * | 9/1998 | Lee | ............................ | G06F 1/30 365/226 |
| 5,918,059 A * | 6/1999 | Tavallaei | .................. | G06F 1/26 713/300 |
| 7,383,457 B1 * | 6/2008 | Knight | ...................... | G06F 1/32 713/320 |
| 8,538,024 B2 * | 9/2013 | Rose | ..................... | H04W 12/04 380/260 |
| 8,605,304 B2 * | 12/2013 | Yanazume | ............ | G06F 1/3246 713/300 |
| 2004/0250149 A1 * | 12/2004 | Tsai | .......................... | G06F 1/26 713/330 |
| 2007/0135105 A1 * | 6/2007 | Bitou | ........................ | G06F 1/24 455/414.1 |
| 2007/0214372 A1 * | 9/2007 | Doyon | .................. | H04M 19/08 713/300 |

(Continued)

FOREIGN PATENT DOCUMENTS

JP 4-1570 A 1/1992

*Primary Examiner* — Ji H Bae
(74) *Attorney, Agent, or Firm* — Sughrue Mion, PLLC

(57) ABSTRACT

An analytical device including a main circuit, a main power supply switch and a control unit which acquires measurement data from main circuit and exchanges data with another device. Said analytical device further includes a hard switch and a relay switch which assumes either an ON state in which electric power is supplied to the main circuit or an OFF state in which electric power is not supplied to the main circuit, wherein the control unit, upon receiving input of a first input signal for setting the main power supply switch to an OFF state, if the main circuit is causing the device main body unit to operate, provides notification of the fact that the device main body unit is operating, and upon receiving input of a second input signal for setting the main power supply switch to an OFF state, sets the relay switch to an OFF state.

17 Claims, 4 Drawing Sheets

(56) References Cited

U.S. PATENT DOCUMENTS

2014/0122905 A1* 5/2014 Chen .................. G06F 1/26
713/300

* cited by examiner

ANALYTICAL DEVICE

This application incorporates by reference Japan Patent Publication No. 2013-171444, published Sep. 2, 2013, to the same inventors in its entirety.

TECHNICAL FIELD

The present invention relates to an analytical device which performs ON/OFF control of a power supply which supplies electric power, particularly, to an analytical device wherein the power supply may be turned off during data communication or during operation.

BACKGROUND ART

In recent years, office automation has progressed, computers have been installed in various locations, and have been connected via some sort of communication line (EtherNet®, USB, 1394, RS232C, various types of wireless communication, etc.) to analytical devices (liquid chromatographs, gas chromatographs, mass spectrometers, spectrophotometers, bio-related devices, X-ray surface devices, environmental equipment, testing equipment, etc.) (for example, see Patent Literature 1).

With this sort of configuration, when the user is to initiate analysis, application software is launched on the computer, the computer and analytical device are put into a communication state, and analysis is executed on the analytical device using the application software. While analysis is being executed, the computer acquires measurement data from the analytical device at a predetermined timing. The computer thus performs various sorts of processing on the measurement data. Subsequently, the user terminates the application software on the computer, and puts the computer and analytical device into a disconnected state.

Figure 4:
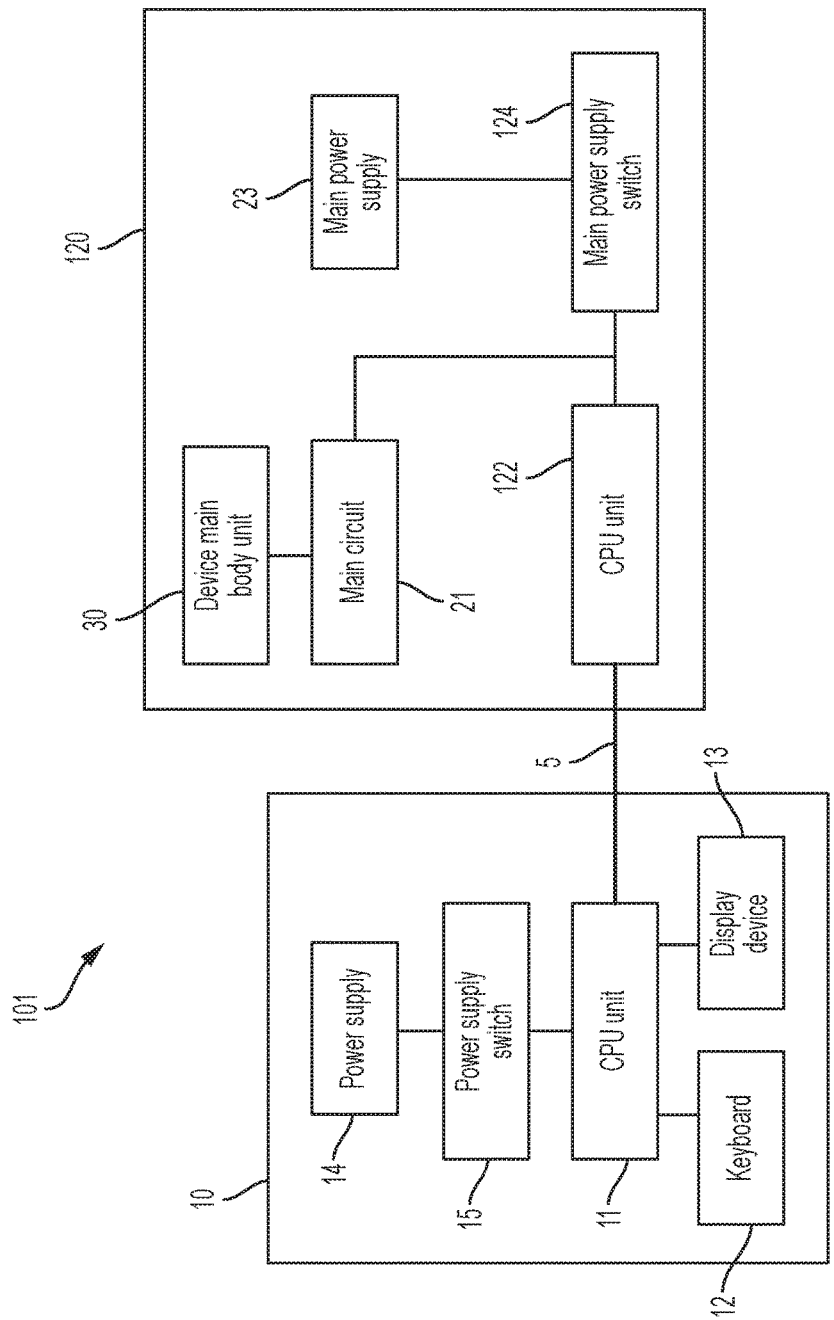

Here, FIG. 4 is a simplified diagram showing a control system to which a conventional analytical device and computer have been connected. The control system 101 comprises an analytical device 120 and a computer 10, the computer 10 and analytical device 120 being connected by a communication line 5, such a communication cable, telephone line or LAN.

The computer 10 comprises a CPU unit 11 which exchanges data with the analytical device 120, a keyboard (input device) 12 used to perform input operations, a display device 13 on which images are displayed, a power supply 14 which supplies electric power to the CPU unit 11 and the like, and a power supply switch 15 which is provided for instance on a side surface of the case and is operated by input to assume either an ON state or an OFF state.

The CPU unit 11 is able to start up application software and establish communication with the analytical device 120 based on input signals inputted via the keyboard 12.

The analytical device 120 comprises a device main body unit 30, a main circuit 21 which causes the device main body unit 30 to operate, a CPU unit (control unit) 122 which acquires measurement data from main circuit 21 and exchanges data with the computer 10, a main power supply 23 which supplies electric power to main circuit 21 and CPU unit 122, and a main power supply switch 124 which is provide for instance on a side surface of the case and is operated by input to assume either an ON state or an OFF state.

The main circuit 21 is an LCD display circuit, lamp power supply circuit, motor circuit, temperature control circuit, etc.

CPU unit 122 controls the main circuit 21 by receiving various types of data from the CPU unit 11, and performs various functions by transmitting various types of data to the CPU unit 11.

When the main power supply switch 124 assumes an ON state, the CPU unit 122 and main circuit 21 are supplied with electric power from the main power supply 23 and start to operate.

Thus, with this sort of control system 101, to initiate analysis, the user depresses the power supply switch 15 of the computer 10 and the main power supply switch 124 of the analytical device 120, thereby actuating the two switches. Next, application software is started up on the computer 10, the computer 10 and analytical device 120 are put in a communication state, and then the application software is used to execute analysis on the analytical device 120. While analysis is being executed, the computer 10 acquires measurement data from the analytical device 120 at a predetermined timing. The computer 10 thus performs various types of processing on the measurement data. Subsequently, the user terminates the application software on the computer 10, and the computer 10 and analytical device 120 are put in a disconnected state. Finally, the power supply switch 15 of the computer 10 and the main power supply switch 124 of the analytical device 120 are depressed again, thereby stopping the function of both of them.

PRIOR ART LITERATURES (Patent literature 1) Japanese Unexamined Patent Application Publication H4-1570

However, in a control system 101 as described above, while the computer 10 and analytical device 120 are performing data communication, for example, when the CPU unit 122 of the analytical device 120 is executing analysis and performing processing to transmit measurement data, if the main power supply switch 124 of the analytical device 120 is depressed intentionally or due to operator error, there are problems such as that the function of the analytical device 120 will stop instantaneously and the measurement data in transmission will be lost. Furthermore, the computer 10 will detect a communication error and attempt a recovery operation such as data retransmission, but since there will be no response from the analytical device 120, the data transmission function will be stopped and error log information will remain in the computer.

Furthermore, there is the problem that, in the event that the main power supply switch 124 is depressed accidentally or due to operator error while the CPU unit 122 of the analytical device 120 is performing data processing, even if data communication is not being performed between the computer 10 and the analytical device 120 at the time, the functioning of the analytical device 120 will instantaneously stop and the measurement data being processed will be lost.

SUMMARY OF THE INVENTION

Thus, it is a purpose of the present invention to provide an analytical device whereof the power will not be turned off during data communication or operation.

The analytical device of the present invention, made to resolve the aforementioned problems, is an analytical device comprising a main circuit which causes a device main body unit to operate; a main power supply which supplies electric power; a main power supply switch which is operated by input to assume either an ON state in which electric power is supplied to said main circuit, or an OFF state in which electric power is not supplied to said main circuit; and a control unit which acquires measurement data from said main circuit and exchanges data with another device, said analytical device further comprising a hard switch which assumes either an ON state in which electric power is supplied to said control unit, or an OFF state in which electric power is not supplied to said control unit; and a relay switch which assumes either an ON state in which electric power is supplied to said main circuit or an OFF state in which electric power is not supplied to said main circuit, wherein said main power supply switch outputs, to said control unit, a first input signal for setting either an ON state in which electric power is supplied to said main circuit or an OFF state in which electric power is not supplied to said main circuit, and said control unit, upon receiving input of the first input signal for setting said main power supply switch to an OFF state, if said main circuit is causing the device main body unit to operate, provides notification of the fact that said device main body unit is operating, and upon receiving input of a second input signal for setting said main power supply switch to an OFF state, sets said relay switch to an OFF state.

Here, "device main body unit" refers to components for performing analysis.

Furthermore, "other device" refers to a device connected to the analytical device via some sort of communication line (EtherNet, USB, 1394, RS232C, various types of wireless communication, etc.), for example, a computer capable of running application software.

The analytical device of the present invention comprises a main power supply switch, a hard switch and a relay switch. The main power supply switch does not directly turn the connection between the main power supply and the main circuit on and off, but rather only inputs an input signal into the control unit. Namely, the main power supply switch, unlike a conventional power supply switch, is physically unrelated to the connection between the main power supply and the main circuit. The present invention is configured such that the physical disconnection of the supply of electric power to the main circuit is accomplished by means of a relay switch. This relay switch operates based on instructions from the control unit. In this way, the control unit, when it has detected that an input signal for placing the main power supply switch into an OFF state has been inputted, performs the necessary processing and then disconnects the main power supply from the main circuit.

With the analytical device of the present invention, as described above, the main power supply and the main circuit can be disconnected after the necessary processing has been performed, and thus the power supply is never turned off during operation.

Furthermore, the invention described above may be made such that said control unit is able to assume either a communication state in which exchange of data with other devices is possible, or a disconnected state in which exchange of data with other devices is not possible; and prior to setting said relay switch to an OFF state, if data is being exchanged with another device, termination processing of data exchange with the other device is performed.

With the analytical device of the present invention, the main power supply can be disconnected from the main circuit after the required processing has been performed, and thus the power supply is never turned off during data communication.

Furthermore, the invention described above may be made such that said control unit, prior to setting said relay switch to an OFF state, sets said device main body unit to an initialization state by means of said main circuit.

With the analytical device of the present invention, it is possible to turn the power supply off after a suitable state (initialization state) for the analytical device has been assumed, such as returning the sample injection needle to a predetermined location and moving various movable components to a position such that the startup time (home position detection) of the device will be shortened next time the power supply is turned on.

Furthermore, the invention described above may be made such that said control unit, prior to setting said relay switch to an OFF state, stores device main body unit associated data acquired from said main circuit.

With the analytical device of the present invention, it is possible for example to save (a large volume of) parameters (device main body unit associated data) to nonvolatile memory, and to compute and write a sum code (device main body unit associated data) thereto.

Furthermore, the invention described above may be made such that said control unit sets said relay switch to an OFF state upon receiving input of a third input signal for setting the main power supply switch to an OFF state from another device.

With the analytical device of the present invention, it is possible to perform ON/OFF control of the analytical device from another device, i.e. from a computer (located in a remote location, such as an adjacent analysis room), making it possible, for example, to perform ON/OFF control of multiple analytical devices with a single operation.

BRIEF DESCRIPTION OF THE DRAWINGS (FIG. 1) A simplified diagram showing an example of a control system to which an analytical device of the present invention and a computer have been connected.

Figure 1:
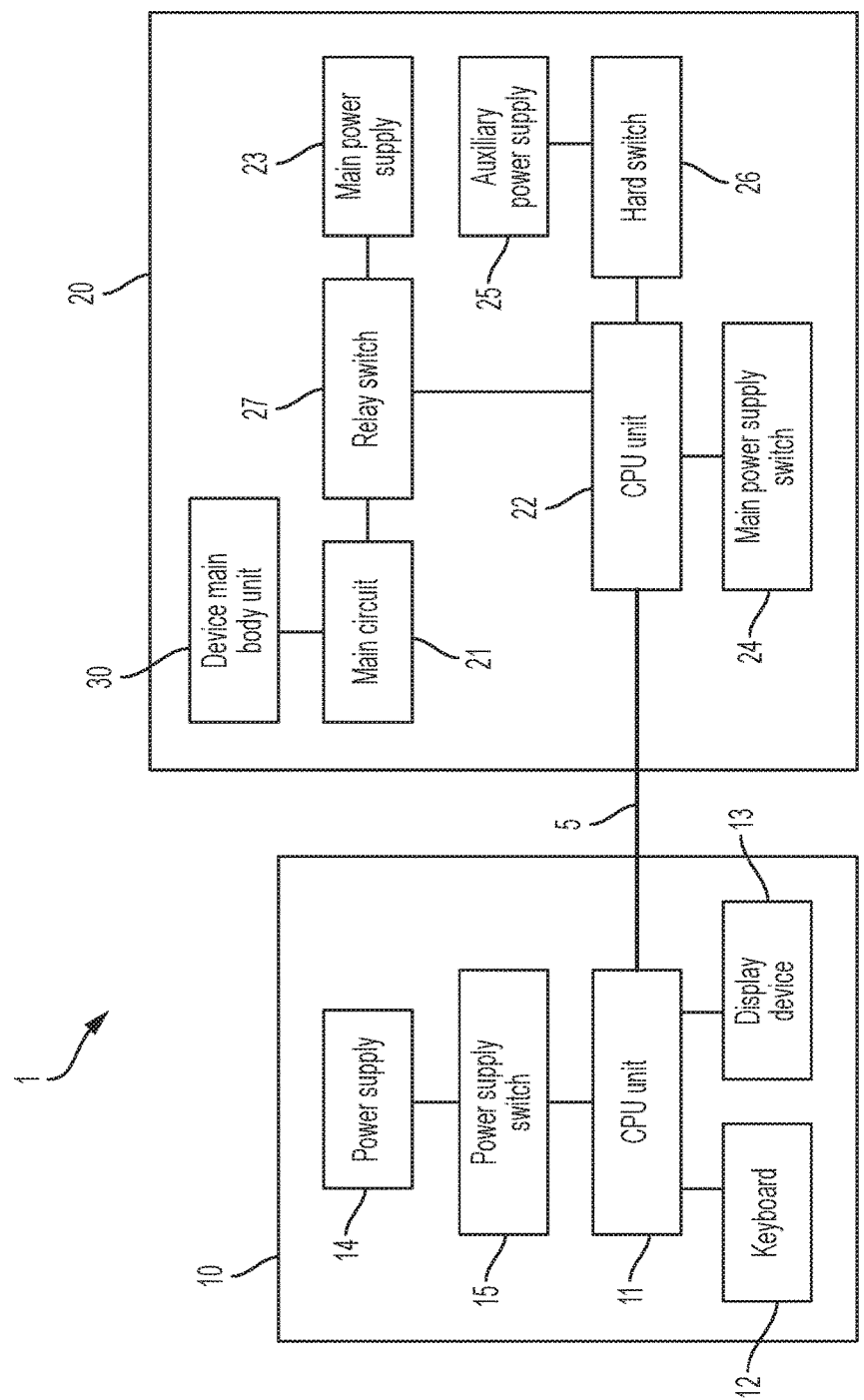

(FIG. 2) A circuit diagram of an analytical device shown in FIG. 1.

(FIG. 3) A flow chart intended to explain the control method for ON/OFF control of a power supply.

(FIG. 4) A simplified diagram showing a control system to which a conventional analytical device and a computer have been connected.

DETAILED DESCRIPTION OF THE EXEMPLARY EMBODIMENT

A mode of embodiment of the present invention will be described below using the drawings. It will be noted that the present invention is of course not limited to the mode of embodiment described below and includes various other modes which do not depart from the gist of the present invention.

Figure 2:
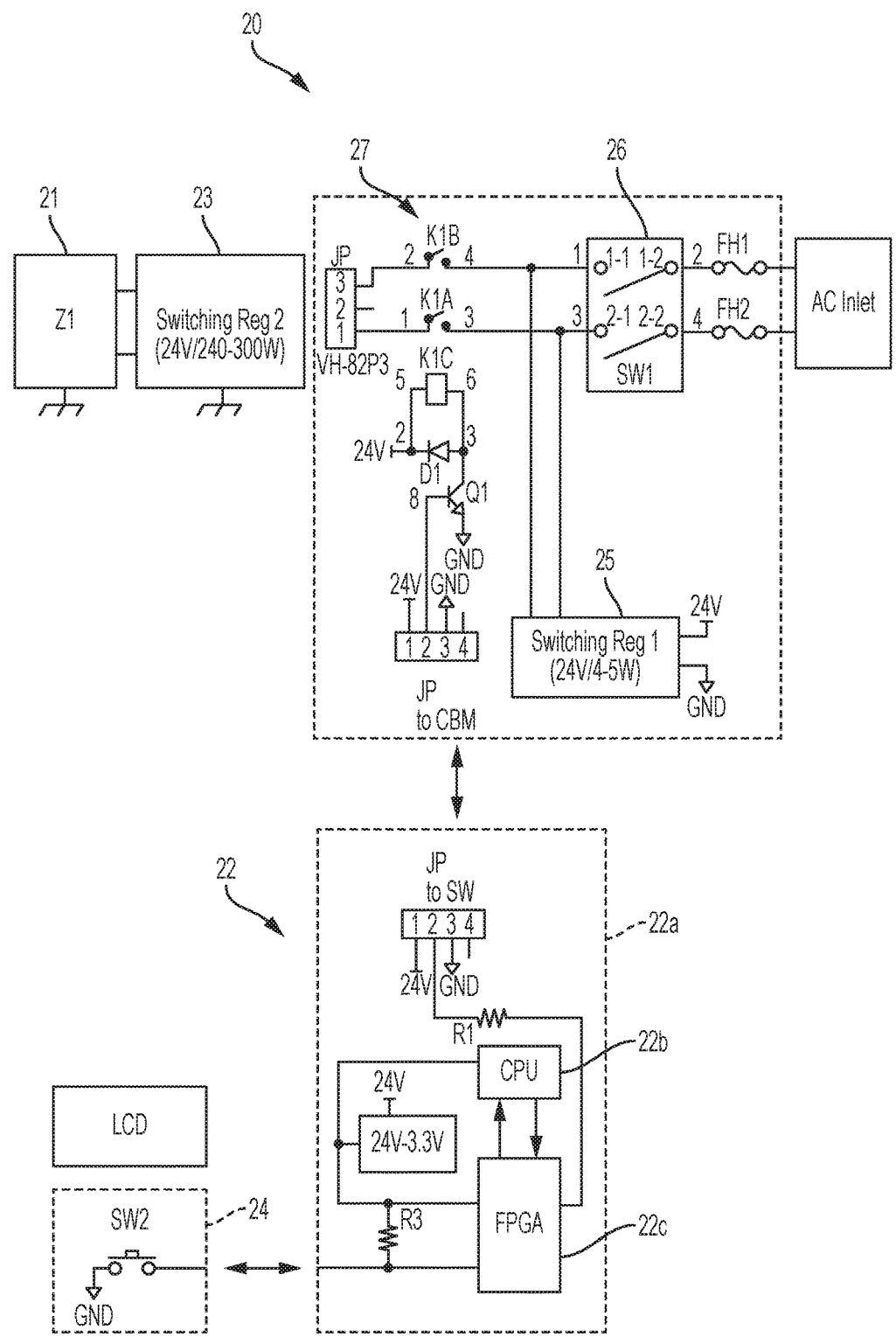

FIG. 1 is a simplified diagram showing an example of a control system to which an analytical device of the present invention and a computer have been connected. Furthermore, FIG. 2 is a circuit diagram of the analytical device shown in FIG. 1. The same reference symbols have been assigned to parts which are the same as in the control system 101 described above.

Control system 1 comprises an analytical device 20 and computer 10, the computer 10 and analytical device 20 being connected by a communication line 5 such as a communication cable, telephone line or LAN.

The analytical device 20 comprises a device main body unit 30; a main circuit 21 (Z1) which causes the device main body unit 30 to operate; a CPU unit (control unit) 22 which acquires measurement data from main circuit 21 (Z1) and exchanges data with a computer 10; a main power supply 23 (Switching Reg 2) which supplies electric power to main circuit 21 (Z1); an auxiliary power supply 25 (Switching Reg 1) which supplies electric power to CPU unit 22; a main power supply switch 24 (SW2) which is provided for instance on the front surface of the case and is operated by input to assume either an ON state or an OFF state; a hard switch 26 (SW1) which is provided for instance on a side surface of the case and is operated by input to assume either an ON state or an OFF state; and a relay switch 27 (K1) which assumes either an ON state or an OFF state.

CPU unit 22 comprises a CPU board 22a, and a CPU 22b, FPGA (Field-Programmable Gate Array) 22c, memory (not illustrated) and communication circuit (not illustrated), which are mounted on CPU board 22a, wherein the main circuit 21 (Z1) is controlled by receiving various types of data from CPU unit 11, and various functions are accomplished by transmitting various types of data to CPU unit 11.

This CPU unit 22 starts to operate when hard switch 26 (SW1) assumes an ON state and electric power is supplied from axiliary power supply 25 (Switching Reg 1) as a result.

Main circuit 21 (Z1) is supplied with electric power from main power supply 23 (Switching Reg 2) and starts to operate when relay switch 27 (K1) assumes an ON state. Namely, supply of electric power is provided and stopped to the CPU unit 22 and main circuit 21 (Z1) through different switches. Thus, the CPU unit 22 is unrelated to the main power supply 23 (Switching Reg 2). Furthermore, the relay switch 27 (K1) is not depressed by the user but rather operates based on instructions from CPU unit 22. Namely, CPU unit 22 can determine whether the relay switch 27 (K1) should be turned on or turned off. A solid state relay or other semiconductor relay or a remote on-off function built into a switching power supply can be used as the relay switch 27 (K1).

To perform an input operation which determines whether or not electric power is to be supplied to the main circuit 21 (Z1), the user depresses the main power supply switch 24 (SW2). The main power supply switch 24 (SW2) does not directly turn the connection between the main power supply 23 (Switching Reg 2) and main circuit 21 (Z1) on and off, but only inputs an input signal into the CPU unit 22. Namely, the main power supply switch 24 (SW2) is physically unrelated to the connection between the main power supply 23 (Switching Reg 2) and the main circuit 21 (Z1).

Figure 3:
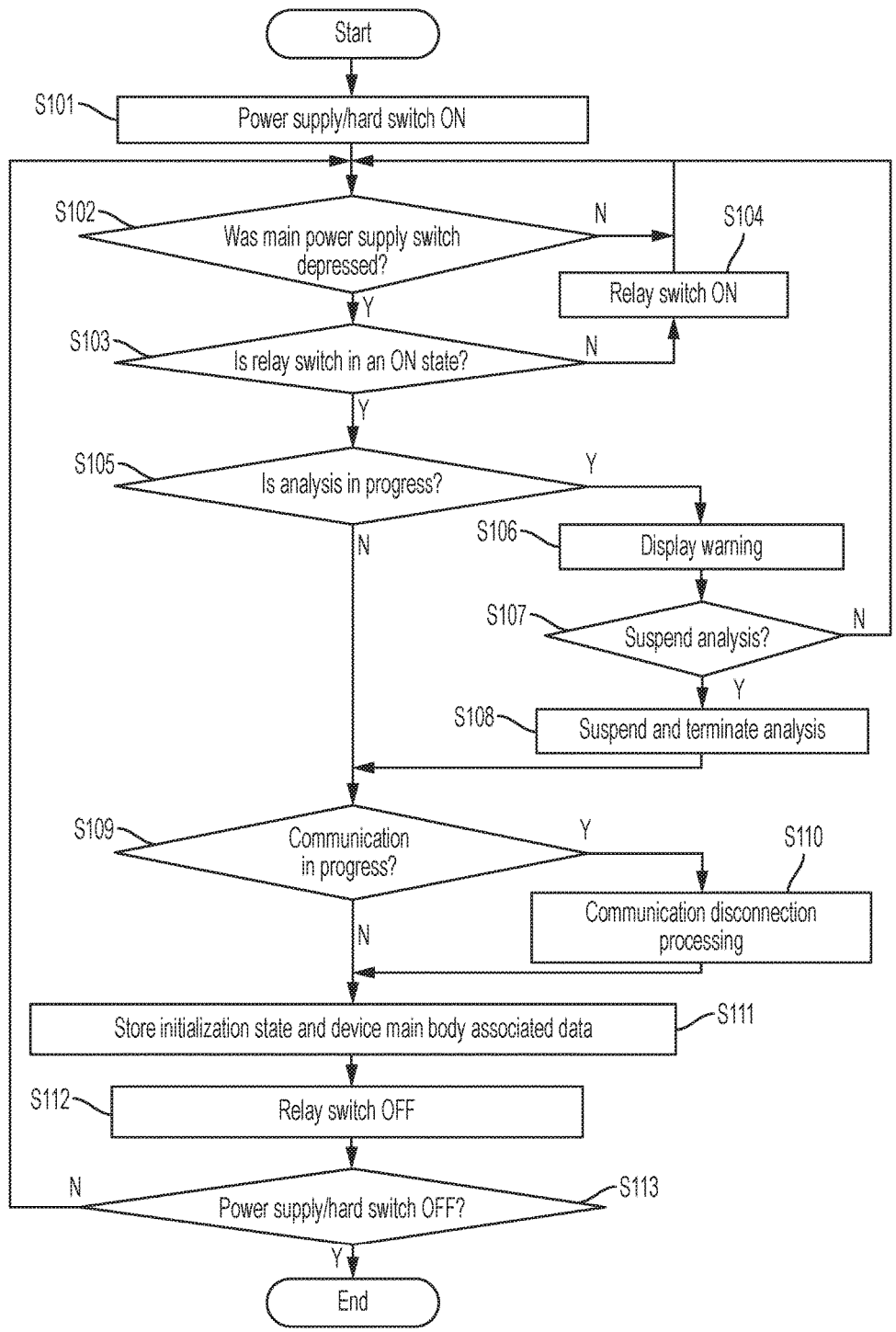

Here, an example of the control method for ON/OFF control of the power supply in control system 1 will be described. FIG. 3 is a flow chart intended to explain the control method for ON/OFF control of the power supply.

First, in the processing of step S101, the user turns the power supply switch 15 of computer 10 and the hard switch 26 (SW1) of analytical device 20 on. At that time, electric power from auxiliary power supply 25 (Switching Reg 1) is supplied via an interconnector connection cable to (a portion of the circuits of) CPU board 22a, and the CPU 22b starts to operate. Here, since FPGA 22c is at low output and the relay switch 27 (K1) is off, electric power from main power supply 23 (Switching Reg 2) is not supplied to main circuit 21 (Z1). In this state, the CPU 22b is operating and is able to detect whether or not the main power supply switch 24 (SW2) has been depressed, but to the user, the device main body unit 30 appears to be off (in a standby state).

Next, in the processing of step S102, the CPU unit 22 determines whether or not the main power supply switch 24 (SW2) has been depressed (whether a first input signal for setting the main power supply switch 24 (SW2) in an OFF state has been inputted or not). If it is determined that the main power supply switch 24 (SW2) has not been depressed, the processing of step S102 is repeated.

On the other hand, if it is determined that the main power supply switch 24 (SW2) has been depressed, then in the processing of step S103, the CPU unit 22 determines if the relay switch 27 (K1) is in an ON state or an OFF state. If it is determined that the relay switch 27 (K1) is in an OFF state, then in the processing of step S104, the relay switch 27 (K1) is put into an ON state, after which the processing returns to step S102. In this state, the user becomes able to execute analysis.

On the other hand, if it is determined in the processing of step S103 that the relay switch 27 (K1) is in an ON state, then in the processing of step S105, since the state is one in which analysis can be executed, the CPU unit 22 determines if analysis is in progress or not. If it is determined that analysis is in progress, then in the processing of step S106, the CPU unit 22 displays the warning "Analysis is in progress. Suspend analysis and turn off power supply?" on the main body of the analytical device 20. The warming may also be transmitted to the computer 10 and displayed on display device 13.

Next, in the processing of step S107, it is determined if the user has selected, through an input operation using keyboard 12, to suspend analysis and put the main circuit 21 in an OFF state (YES) or to continue analysis and maintain the main circuit 21 in an ON state (NO). If it is determined that an ON state (NO) was selected, processing returns to step S102. Thus, the user is able to confirm operator error and that analysis is in progress.

On the other hand, if it is determined that an OFF state (YES) was selected (if a second input signal for setting the main power supply switch 24 (SW2) to an OFF state was inputted), then in the processing of step S108, in the CPU unit 22, the main circuit 21 (Z1) suspends the operation of the device main body unit 30.

Furthermore, in the processing of step S105, if it is determined that analysis is not in progress, or if the processing of step S108 has terminated, then in the processing of step S109, the CPU unit 22 determines if communication is in progress. If it is determined that communication is in progress, then in the processing of step S110, disconnection processing is performed with regard to the exchange of data with the computer 10.

Furthermore, in the processing of step S109, if it is determined that communication is not in progress, or if the processing of step S110 has terminated, then in the processing of step S111, the CPU unit 22 places the device main body unit 30 into an initialization state by means of main circuit 21 (Z1), and acquires device main body unit related data from the main circuit 21 (Z1) and stores it in memory. As the initialization state, for instance, a state suitable for the analytical device 20, such as returning the sample injection needle to a predetermined location and moving various movable components to a position such that the startup time (home position detection) of the device will be shortened next time the power supply is turned on, is preset in memory. Furthermore, examples of device main body unit associated data include settings parameters of the analytical device, sum codes and the like.

Next, in the processing step S112, the CPU unit 22 sets the relay switch 27 (K1) to an OFF state.

Finally, in the processing of step S113, the user decides whether or not to turn off the power supply switch 15 of the computer 10 and the hard switch 26 (SW1) of the analytical device 20. If it is determined that these are not to be turned off, the processing returns to step S102.

On the other hand, if it is determined that these are to be turned off, the flow chart can be terminated, but it is usually more convenient for the user to use the analytical device 20 without turning the hard switch 26 off.

With the control system 1 of the present invention, as described above, it is possible to disconnect the main power supply 23 from the main circuit 21 after the required processing has been performed, so that the power supply is not turned off during operation or during data communication. Furthermore, the power supply can be turned off after a state suitable for the analytical device 20 (an initialization state) has been assumed. Moreover, it is possible to save (a large volume of) parameters (device main body unit associated data) to nonvolatile memory, and to compute and write a sum code (device main body unit associated data) thereto.

Other Modes of Embodiment (1) In the control system 1 described above, the analytical device 20 was represented as having a configuration comprising one main power supply 23 and one CPU unit 22, but a configuration wherein the analytical device comprises multiple main power supplies and multiple CPU units may also be employed. If the analytical device comprises multiple CPU units, it is preferable to constantly supply electric power to the main CPU unit so as to effect ON/OFF control of the main power supply, and when the main power supply is to be turned off, to have the supply of electric power to the sub CPU units and peripheral circuits stopped after communication with the computer CPU has been disconnected by the main CPU unit.

(2) It is also possible to have the CPU unit 22 set the relay switch 27 into an OFF state based on the input of a third input signal for setting the main power supply switch 24 to an OFF state from the computer 10. Here, if multiple analytical devices are connected to the computer 10, ON/OFF control of the multiple analytical devices can be effected at once through a single operation (input of a third input signal).

INDUSTRIAL APPLICABILITY

The present invention can be employed for analytical devices which perform ON/OFF control of a power supply which supplies electric power.

DESCRIPTION OF REFERENCE SYMBOLS

10 Computer (other device)
21 Main circuit
22 CPU unit (control unit)
23 Main power supply
24 Main power supply switch
26 Hard switch
27 Relay switch
30 Device main body unit

What is claimed is:
1. An analytical device comprising:
a main circuit which causes a device main body unit to operate;
a main power supply which supplies electric power to the main circuit;
a main power supply switch which is operated by input to assume either an ON state in which electric power is supplied to said main circuit, or an OFF state in which electric power is not supplied to said main circuit; and
a processor configured to:
receive measurement data from said main circuit and exchange data with another device, and
determine whether or not electric power is to be supplied to the main circuit based on a first input signal which said main power supply switch outputs;
wherein said analytical device further comprises:
a hard switch which assumes either an ON state in which electric power is supplied to said processor, or an OFF state in which electric power is not supplied to said processor; and
a switching unit which assumes either an ON state in which electric power is supplied to said main circuit or an OFF state in which electric power is not supplied to said main circuit, based on a judgement result of the processor,
wherein said main power supply switch outputs, to said processor, the first input signal for setting either an ON state in which electric power is supplied to said main circuit or an OFF state in which electric power is not supplied to said main circuit, based on a judgement result of the processor; and
said processor, upon receiving input of the first input signal for setting said main power supply switch to an OFF state, if said main circuit is causing the device main body unit to operate, is further configured to provide notification that said device main body unit is operating, and
said processor, upon receiving input of a second input signal for setting said main power supply switch to an OFF state, is further configured to set said switching unit to an OFF state.

2. The analytical device as described in claim 1, wherein said processor is configured to assume either a communication state in which exchange of data with other devices is possible, or a disconnected state in which exchange of data with other devices is not possible, and
prior to setting said switching unit to an OFF state, if data is being exchanged with another device, the processor is configured to perform termination processing of data exchange with the other device.

3. The analytical device as described in claim 1, wherein said processor, prior to setting said switching unit to an OFF state, is configured to set said device main body unit to an initialization state by means of said main circuit.

4. The analytical device as described in claim 1, wherein said processor, prior to setting said switching unit to an OFF state, is configured to store device main body unit associated data received from said main circuit.

5. The analytical device as described in claim 1, wherein said processor is configured to set said switching unit to an OFF state upon receiving input of a third input signal for setting the main power supply switch to an OFF state from another device.

6. The analytical device as described in claim 2, wherein said processor, prior to setting said switching unit to an OFF state, is configured to set said device main body unit to an initialization state by means of said main circuit.

7. The analytical device as described in claim 2, wherein said processor, prior to setting said switching unit to an OFF state, is configured to store device main body unit associated data received from said main circuit.

8. The analytical device as described in claim 3, wherein said processor, prior to setting said switching unit to an OFF state, is configured to store device main body unit associated data received from said main circuit.

9. The analytical device as described in claim 6, wherein said processor, prior to setting said switching unit to an OFF state, is configured to store device main body unit associated data received from said main circuit.

10. The analytical device as described in claim 2, wherein said processor is configured to set said switching unit to an OFF state upon receiving input of a third input signal for setting the main power supply switch to an OFF state from another device.

11. The analytical device as described in claim 3, wherein said processor is configured to set said switching unit to an OFF state upon receiving input of a third input signal for setting the main power supply switch to an OFF state from another device.

12. The analytical device as described in claim 4, wherein said processor is configured to set said switching unit to an OFF state upon receiving input of a third input signal for setting the main power supply switch to an OFF state from another device.

13. The analytical device as described in claim 6, wherein said processor is configured to set said switching unit to an OFF state upon receiving input of a third input signal for setting the main power supply switch to an OFF state from another device.

14. The analytical device as described in claim 7, wherein said processor is configured to set said switching unit to an OFF state upon receiving input of a third input signal for setting the main power supply switch to an OFF state from another device.

15. The analytical device as described in claim 8, wherein said processor is configured to set said switching unit to an OFF state upon receiving input of a third input signal for setting the main power supply switch to an OFF state from another device.

16. The analytical device as described in claim 9, wherein said processor is configured to set said switching unit to an OFF state upon receiving input of a third input signal for setting the main power supply switch to an OFF state from another device.

17. The analytical device as described in claim 1, wherein the switching unit is a relay switch.

* * * * *